United States Patent [19]
Leveque

[11] 3,940,178
[45] Feb. 24, 1976

[54] SPARE TIRE MOUNTING

[76] Inventor: Edward L. Leveque, Rte. 1, M-55, Wellston, Mich. 49689

[22] Filed: Jan. 18, 1974

[21] Appl. No.: 434,371

[52] U.S. Cl. ............ 296/37.2; 224/42.2; 224/42.24; 296/37 A
[51] Int. Cl.² ........................................ B62D 43/08
[58] Field of Search ............. 224/42.2, 42.24, 42.21, 224/42.25, 42.12, 42.13, 42.32; 296/37.2, 37 A, 37 R, 39 R

[56]  References Cited
UNITED STATES PATENTS

| | | | |
|---|---|---|---|
| 1,208,825 | 12/1916 | Pearson | 224/42.2 X |
| 2,733,847 | 2/1956 | Pyes | 224/42.21 |
| 3,008,755 | 11/1961 | Hale | 296/37.2 X |
| 3,046,048 | 7/1962 | Cheney | 296/95 C |
| 3,081,924 | 3/1963 | Merbler et al. | 224/42.24 |
| 3,382,889 | 5/1968 | Heinz et al. | 296/154 X |
| 3,610,678 | 10/1971 | Brokaw | 224/42.13 |
| 3,613,972 | 10/1971 | Daughhetee | 224/42.24 |
| 3,627,373 | 12/1971 | Fox | 296/31 P X |

FOREIGN PATENTS OR APPLICATIONS 862,378  3/1961  United Kingdom ............... 296/39 R Primary Examiner—Robert J. Spar
Assistant Examiner—Jerold M. Forsberg
Attorney, Agent, or Firm—Price, Heneveld, Huizenga & Cooper

[57]  ABSTRACT

The specification discloses apparatus for mounting a spare wheel and tire in a vehicle, and especially in a cargo box of a pickup truck wherein the spare is secured against one side wall of the box and does not extend above the side wall whereby rear vision of a driver of the truck remains unimpeded. The apparatus includes a well recessed in the floor of the box for receiving the spare adjacent the side wall and behind the cab of the truck and hinged bracket securing means allowing insertion and removal of the spare into and from the well.

11 Claims, 9 Drawing Figures

OUTLINE OF TYPICAL CAMPER UNIT

SPARE TIRE MOUNTING

BACKGROUND OF THE INVENTION

Various methods are available for mounting spare wheels and tires on motor vehicles and especially vehicles of the light-duty cargo and recreational types such as pickup trucks. With pickup trucks, a first method is to suspend the spare wheel and tire horizontally beneath the frame at the rear of the truck in a type of suspension apparatus. With this method, if the spare must be used, the device can be released dropping the tire beneath the truck where it can be pulled out for use. The principal drawback of this mounting is that the spare wheel and tire is exposed to mud, dirt, salt, as well as water and the like thereby causing the wheel and tire to corrode and otherwise deteriorate. Also, such method makes use of the tire very difficult because of the caked-on mud, dirt, and the like as well as the extremely inconvenient position in which the tire is secured.

A second method is to mount the spare inside the cargo box of the pickup truck either horizontally somewhat on the floor of the box or vertically atop the floor along one of the sides. These methods are undesirable because the horizontal method utilizes a large amount of the cargo storage space and prevents the insertion of camper units which must be slid into the box along the floor. The prior known vertical mounting has similar drawbacks in that it projects above the side wall of the box also preventing the insertion of camper units into the truck. Such projection above the side wall also makes the vertical mounting extremely unsafe especially when the tire is mounted against one side wall immediately behind the cab of the truck on the opposite side from the driver. The upward projection substantially blocks the driver's view over that side of the truck preventing him from seeing traffic on his right or other objects when he is backing up.

A third method for mounting spare wheels and tires on pickup trucks is on the outside of the box or inside the side walls of the box through a door accessible from the outside of the box. The former of these third methods also exposes the spare to varying weather conditions having the above-noted drawbacks as well as making the wheel and tire extremely accessible to theft. When the spare is mounted in the side wall through a door, it of course can be locked therein but such mountings are expensive and necessitate the manufacture of a separate tire compartment within the wall of the truck.

SUMMARY OF THE INVENTION

Accordingly, it is the purpose of the present invention to provide mounting apparatus for spare wheels and tires in vehicles. More particularly, the invention provides a spare wheel and tire mounting apparatus for pickup trucks and other vehicles. In pickup trucks, the apparatus allows complete driver vision rearwardly of the truck, allows substantially unimpeded use of the cargo space in the box of the truck including the capability of inserting camper units which are slid into the cargo box, and provides a deterrent to theft of the spare wheel and tire. A related purpose of the invention is to provide a covered mounting area for a spare wheel and tire which protects the spare wheel and tire against the effects of the elements and maintains the spare in readiness for immediate use.

In the preferred embodiment, the invention includes a recessed wheel well located rearwardly of the cab of the pickup truck along one of the side walls thereof and bracket means secured to the side wall adjacent the wheel well for securing the spare tire vertically against the side wall and within the well. The wheel well is sufficiently deep such that the top of the tire is no higher than the top of the side wall thereby leaving the driver's vision rearwardly over the spare tire mounting area substantially unobstructed.

The bracket means for securing the spare wheel and tire includes a hinge secured to the side wall and wheel-engaging means which extends outwardly from the hinge over the wheel well. A portion of the wheel-engaging means extends into contact with the side of the central support of the wheel closest to the side wall thereby holding the wheel and tire securely against the side wall. To insert the wheel and tire in the well, the bracket is pivoted upwardly on its hinge allowing the tire to be slid into the well after which the bracket is pivoted downwardly into engagement with the wheel. To remove the spare, the wheel is disengaged from the bracket and the bracket is pivoted upwardly while the tire is slid from the well.

The present mounting apparatus, therefore, results in significant advantages over previously known spare tire mountings including the provision of an accessible, protected area which receives the spare without hindering the visibility of the driver over and through that area. The apparatus also allows substantially unimpeded use of the cargo area including the fitting of camper units which are slid into the cargo box. Further, the mounting provides protection for the spare against both weather and theft as well as an extremely durable, sturdy, and inexpensive mounting device.

These and other objects, advantages, purposes, and features of the invention will become more apparent from a study of the following description taken in conjunction with the drawings.

DESCRIPTION OF THE PREFERRED EMBODIMENT

Figure 1:
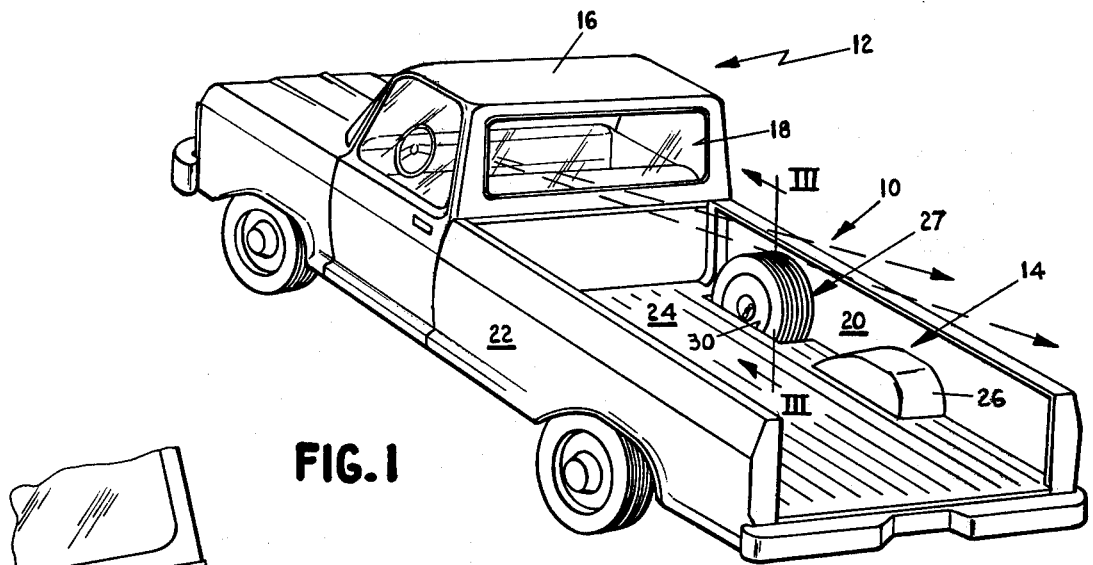
FIG. 1 is a perspective view of a typical pickup truck including the mounting apparatus of the present invention and a spare wheel and tire mounted therein.

Referring now to the drawings in greater detail, FIG. 1 illustrates the present mounting apparatus 10 installed in the cargo box 14 of a typical pickup truck 12. The truck 12 includes a cab 16 and a rear window 18 extending along the rear side of the cab 16. The cargo box 14 includes upstanding generally vertical side walls 20 and 22 extending parallel to one another and rearwardly from the cab as well as a floor 24 therebetween. The side walls 20 and 22 extend to a height no greater than and generally below the level of the bottom of the rear window 18. Along either side wall 20 and 22 on the interior thereof is a closed, upwardly extending wheel housing 26 which forms a closure over the top of the rear wheel mounting area on either side of the truck. Wheel enclosures or housings 26 are usually located approximately two-thirds of the length of the cargo box 14 rearwardly of the cab 16.

The mounting apparatus 10 is located adjacent one of the side walls 20 or 22. In the preferred embodiment illustrated in FIGS. 1–4, the apparatus is located on the passenger side of the vehicle and includes a recessed well 30 as well as a spare wheel-engaging bracket means 40 secured to the side wall above the well 30 such that it extends outwardly thereover. The well 30 is positioned generally parallel to one of the side walls, in this case to right-hand side wall 20, between the position of the wheel enclosure or housing 26 and the rear of the cab 16. Its total width (see FIGS. 3 and 4) is equal to or less than that of wheel enclosure 26. Thus, the cargo box will accept any camper unit that will slide past housing 26 since apparatus 10 takes only an equivalent amount of space along the side wall. The outline of a typical camper unit when inserted in the cargo box is shown in FIG. 3.

Figure 2:
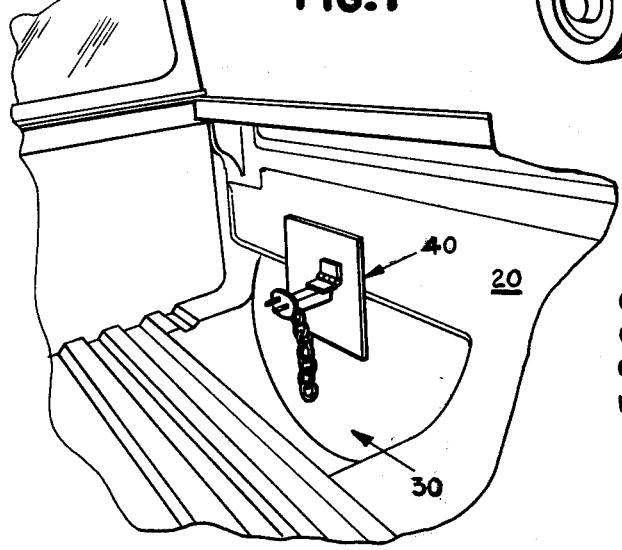
FIG. 2 is a fragmentary, perspective view of the mounting apparatus.
Figure 3:
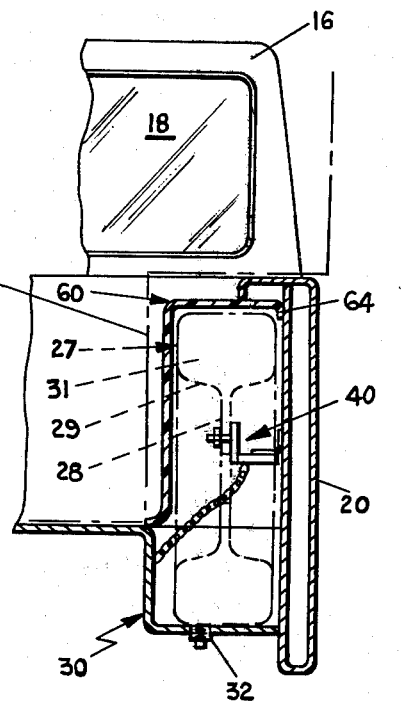
FIG. 3 is a fragmentary, sectional end view of the apparatus taken along plane III—III of FIG. 1.
Figure 4:
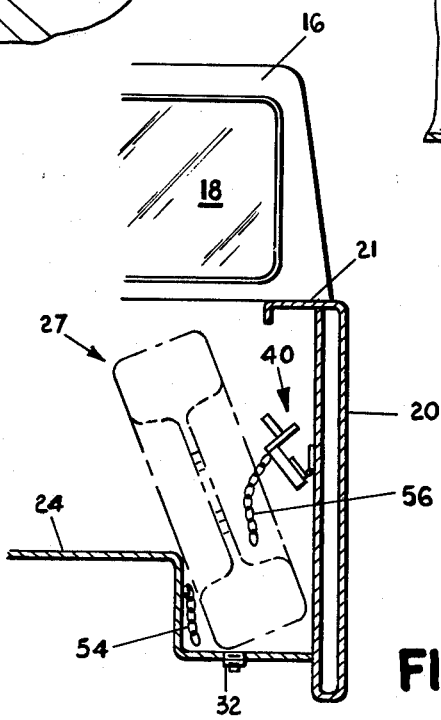
FIG. 4 is a fragmentary, sectional view similar to FIG. 3 but showing the spare tire and wheel as it is being inserted or removed from the well.

The well 30 has a substantially rectangular cross-sectional shape as shown in FIGS. 3 and 4 but is otherwise contoured to the circumferential outline of a spare wheel and tire as shown in FIG. 2. Thus, the well slopes downwardly to a central point at which is located a drain plug 32 (FIGS. 3 and 4) for removing any collected water which may collect therein.

Figure 5:
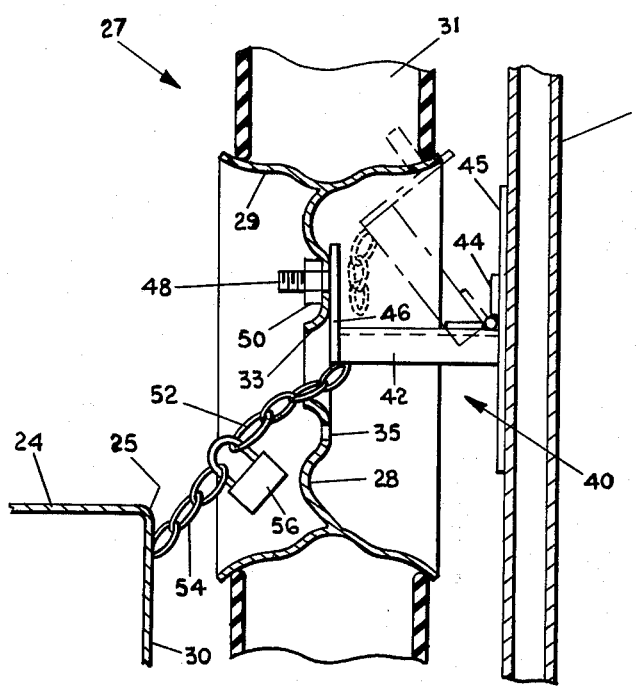
FIG. 5 is an enlarged fragmentary, sectional view of a portion of the apparatus shown in FIGS. 3 and 4.

As shown in FIGS. 3, 4, and 5, the spare wheel land tire 27 received in apparatus 10 is generally of the type including a circular central support 28 with a contoured tire-supporting rim 29 extending around the periphery of support 28 and laterally of either side thereof. The side walls of a pneumatic tire 31 mate with the edges of the rim 29 for support of the tire. The central support 28 includes a central aperture 33 for receiving the end of a wheel-supporting axle when the tire is mounted on the truck as well as a plurality of stud-receiving apertures 35 spaced about the central aperture 33 for securing the wheel and tire to the axle.

Typically, modern pickup trucks have double side walls 20 as shown in FIGS. 3 and 4. The side walls also normally include a flange 21 at the top thereof extending inwardly of the cargo box as shown in those figures. The wheel well 30 is recessed below the level of floor 24 such that it is sufficiently deep to allow the spare wheel and tire 27 of the size utilized on the particular truck to be received in the well with its top fitting below flange 21. The top of tire 31 does not in any case extend above the top of the side wall. Well 30 is also slightly wider than the width of tire 31. Bracket means 40 secure the spare wheel and tire 27 generally parallel to the side wall 20 when it is received in the well. As will be apparent to those skilled in the art, the depth of the well 30 can be made as desired to fit a particular wheel and tire size for the vehicle on which the mounting apparatus 10 is installed. Also, well 30 may be made deeper than the particular wheel and tire needed such that oversize tires, as well as smaller tires, may be secured easily therein.

Figure 6:
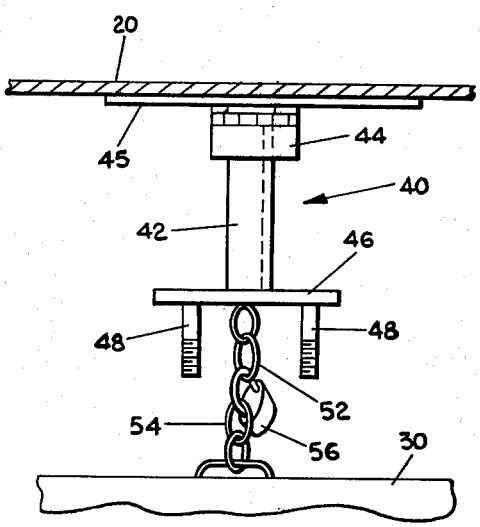
FIG. 6 is a plan view of the mounting bracket shown installed on the side wall of the pickup truck.

As will be best seen in FIGS. 5 and 6, the bracket 40 includes a rigid member 42 extending outwardly of the wall and secured to the wall by a hinge 44. Member 42 is preferably formed from a length of angle iron. Secured normally on the end of member 42 is a spare wheel and tire engaging plate 46 including a pair of parallel studs 48 spaced horizontally apart secured normal to the outer face of plate 46 by welding or the like. The hinge 44 is secured to the side wall of the truck via an additional securing plate 45.

As will be best understood from FIGS. 4 and 5, a spare wheel is inserted in the well by sliding it at an angle to the well. Bracket means 40 is pivoted upwardly for such insertion to the position shown in FIG. 4 and in phantom in FIG. 5. When the tire has reached the bottom of the well, bracket 40 is pivoted downwardly and the spare 27 pivoted upwardly into engagement with studs 48 and plate 46. The spare wheel and tire is thus secured generally parallel to side wall 20 (FIG. 5) with the studs 48 extending through two of the stud-receiving apertures 35 in a position above the central opening 33. Lug nuts 50 of the type normally used to secure the wheel and tire to the vehicle axle are then threaded on studs 48 to hold the tire in its stored position.

The bracket means is spaced above the bottom of the well such that the studs are at the proper height for engaging the apertures 35 above central aperture 33. This height also allows a chain 52 of appropriate length welded or otherwise secured to the bottom of plate 46 to be extended through central aperture 33 and secured via a padlock 56 or the like to a separate length of chain 54 welded or otherwise secured to the side of well 30 (FIGS. 3–6). These chains 52, 54 or other flexible securing means allow the spare to be locked in apparatus 10 to prevent theft.

It will also be understood that the bracket 40 extends extends outwardly from the side wall 20 into engagement with the inside of central support 28, i.e., the side which is closest to the side wall 20, while studs 48 project through support 28 for securing the wheel and tire to the bracket. When the spare is secured in well 30, bracket 40 extends past the plane of the side wall of tire 31 and rim 29 and into engagement with the inside surface of support 28 (see FIGS. 3 and 4).

Removal of the wheel and tire is accomplished by the reverse of the above procedure. After removal of lug nuts 50, the bracket is pivoted upwardly to allow room between the corner 25 of the well 30 and floor 24 and the bottom of the bracket to slide the tire from the well as shown in FIG. 4.

Figure 7:
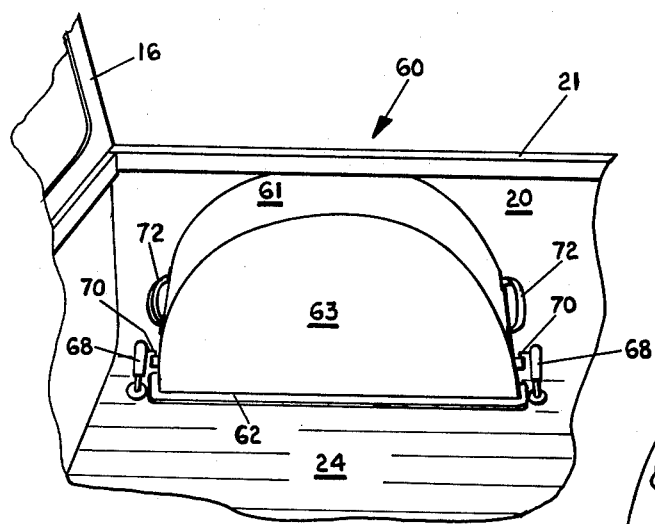
FIG. 7 is a side elevation of the mounting apparatus illustrating the contoured cover therefor.
Figure 8:
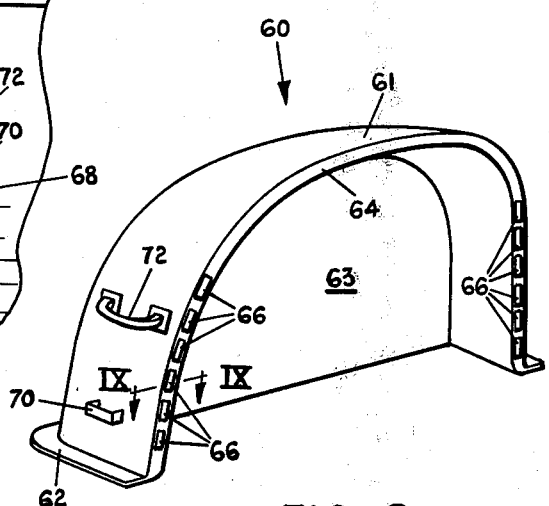
FIG. 8 is a perspective view of the contoured cover shown in FIG. 7.
Figure 9:
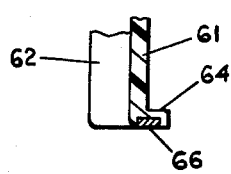
FIG. 9 is a fragmentary, sectional view of a portion of the cover taken along plane IX—IX of FIG. 8.

Referring now to FIGS. 3, 7, and 8, a shell-like cover 60 is provided for use with the mounting apparatus. Cover 60 is generally contoured to the circular shape of a spare tire and wheel and has a well 61 extending in a circular path for covering at least part of the circumference of a spare wheel and tire and a side wheel 63 extending from one edge of wall 61 for covering at least a portion of one side of a spare. A continuous flange 62 extends outwardly around the coplanar bottom edges of walls 61 and 63 for engaging the edge of the well 30 to seal the well and prevent the entry of water, snow, dirt, and the like. A rear flange 64 extends inwardly of the exterior of the cover around the edge of the open side of the cover for abutment with the side wall 20 of the pickup truck. When the pickup truck side wall is formed from a ferro-magnetic material such as steel, a series of magnets 66 set within flange 64 (FIGS. 8 and 9) along either side thereof hold the cover tightly against the side wall as shown in FIG. 3. In trucks or other vehicles, wherein the side wall is made from a nonferro-magnetic material, spring-biased hooks 68 or other securing means on floor 24 engage eyelets 70 secured by riveting or other similar means to the sides of cover 60 to hold the cover in its desired position. Handles 72 are provided on either side of the cover for easy handling. Cover 60 is preferably molded from a resinous plastic or another similar material which resists corrosion and other effects of the element.

Accordingly, the present mounting apparatus provides a simple, effective, and inexpensive method for securing a spare wheel and tire on the interior of a cargo box of a pickup truck. When the tire is mounted therewithin with or without its cover 60, the driver of the truck will have unimpeded vision rearwardly over the mounting area to view passing traffic or other obstacles over the top of side wall 20 (see dotted line in FIG. 1). This is because no part of the tire, when mounted, extends above the side wall. Also, since the mounting apparatus is no wider than the wheel enclosure 26, substantially all types of cargo that can be carried in the normal pickup truck bed can be carried when the spare wheel and tire are mounted as shown herein. The apparatus also prevents theft of the spare tire by use of locking chains 52, 54 and because it is covered when a typical camper unit or other cargo is inserted in the bed of the truck.

The spare wheel and tire are easily inserted in and removed from the well because of the hinged bracket 40. Access to the tire is appropriately simplified over previously known spare mounting methods. Further, the spare wheel and tire is protected from mud, dirt, snow, ice, or the like because of its protected position and cover 60. It will be understood that the combined recessed well 30 and bracket 40 may be mounted adjacent any upstanding wall in any type of vehicle for the mounting of spare wheels and tires. Application of the invention is not limited solely to cargo boxes of pickup trucks.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows:

1. Apparatus for mounting a spare wheel and tire in a vehicle such as a pick-up truck comprising a cab, a rear window in said cab, a cargo box having a floor, and side walls which extend above said floor rearwardly of said cab to a level no higher than the bottom of said rear window, the height of said side walls above said floor generally being less than the diameter of one of the wheels and tires used to movably support said vehicle, a wheel housing along and immediately adjacent each side of said side walls for covering a wheel and tire when mounted for support of the vehicle, said housings each having a height no greater than said side walls and a predetermined width extending out from the side wall along which it is located, the distance between said wheel housings permitting insertion of cargo along said cargo box floor between said housings and said height of said housings permitting cargo to extend over said housings along the top edges of said side walls; means for mounting a spare wheel and tire generally parallel to and adjacent one of said side walls behind said cab and accessible from the interior of the cargo box such that no portion of the spare wheel and tire extends above the top of said one side wall; the spare wheel and tire being of the type including a central support having a tire-receiving rim extending about the periphery thereof and laterally of either side thereof, the central support including a vehicle axle-receiving aperture located centrally therein and a plurality of apertures for securing the wheel and tire to the axle spaced about the axle-receiving aperture; said mounting means including a well recessed a predetermined distance below said floor adjacent said one side wall for receiving the spare wheel and tire, and securing means for securing the spare wheel and tire within said well including means for engaging the side surface of the central support adjacent said one side wall when the spare wheel and tire is received in said well; said engaging means including a rigid member, a plate secured on one end of said rigid member, at least one stud extending outwardly from said plate, and hinge means for securing the end of said rigid member opposite said one end to said one side wall adjacent said well; said plate adapted to abut the said side surface of the central support adjacent said axle-receiving aperture while said stud projects through one of the securing apertures for securing the central support to said plate; said hinge means allowing pivotal movement of said engaging means between an operative position for engaging and securing the spare wheel and tire and an inoperative position for insertion of the spare wheel and tire in said well, said width of said wheel well being sufficiently wider than the width of the spare wheel and tire received therein to allow said wheel and tire to be tilted and slid past said securing means when they are pivoted, said well width being no greater than said predetermined width of said wheel housing along said one wall whereby when no cargo is loaded in said cargo box, a driver of said vehicle has unimpeded visibility over said side wall in the area of said mounting means when the spare wheel and tire are secured therein, said mounting means permitting the loading of any cargo in said cargo box such as a camper or the like which would otherwise fit between and over said wheel housings.

2. The improvement of claim 1 wherein said side walls include generally horizontal flanges extending inwardly of the top edges of said side walls, said recessed well being sufficiently deep to receive the spare wheel and tire against said one side wall beneath said flange, the width of said well allowing said wheel and tire to be tilted and slide thereinto beneath said flange.

3. The improvement of claim 1 wherein said bracket means includes flexible securing means adapted to extend through said receiving aperture for locking said tire in said well; and means extending from said well for securing said flexible securing means thereto.

4. The improvement of claim 1 wherein said well includes a recessed bottom member contoured to the shape of a tire and which forms the sides and bottom of said well; said bottom member including a removable drain plug in the bottom thereof.

5. The improvement of claim 1 wherein said mounting means includes a cover contoured to the shape of a wheel and tire, said cover including means for abutting said one side wall and the edge of said well and means for securing said cover over said well.

6. The improvement of claim 5 wherein said one side wall is formed from ferro-magnetic material, said cover being made from a rigid material and including magnets for holding said cover against said one side wall.

7. Apparatus for mounting and securing a spare wheel and tire of the type including a central support and a tire-supporting rim extending around the periphery and laterally of either side of said central support adjacent an upstanding wall of a cargo storage area of a vehicle, the central support including a vehicle axle-receiving aperture located centrally therein and a plurality of apertures for securing the wheel and tire to the axle spaced about the axle-receiving aperture; said apparatus including in combination a recessed well located adjacent the wall and bracket means secured to the wall said bracket means extending over said well and including hinge means for pivotally mounting the bracket means on the wall adjacent said well, a rigid spacing member extending outwardly from said hinge means to a position adjacent the side surface of said central support which is closest to said wall to which said bracket is secured for spacing said spare wheel and tire from the wall, a wheel engaging plate at the outer end of said spacing member for securing said spare wheel and tire to said bracket means, and at least one stud extending from said plate; said well having a width sufficiently wider than the width of the spare wheel and tire to be secured therein to allow said wheel and tire to be tilted and slid past said bracket means when pivoted via said hinge means; said bracket means extending from the wall beyond the plane including the side of the tire and rim closest to said wall when the wheel and tire are received in said well and into engagement with the said side surface of the central support while said stud projects through one of the securing apertures for securing the spare wheel and tire in the well whereby said hinge means allow said bracket means to be pivoted for insertion and removal of the spare wheel and tire into and from the well.

8. The apparatus of claim 7 wherein said bracket means includes flexible securing means adapted to extend through said axle receiving aperture for locking said tire in said well; and means extending from said well for securing said flexible securing means thereto.

9. The apparatus of claim 8 wherein said well includes a recessed bottom member contoured to the shape of a tire and which forms the sides and bottom of said well; said bottom member including a removable drain plug in the bottom thereof.

10. The apparatus of claim 7 including a cover contoured to the shape of a wheel and tire, said cover including means for abutting one side wall and the edge of said well, and means for securing said cover over said well.

11. The apparatus of claim 10 wherein the upstanding wall is formed from ferro-magnetic material, said cover including magnets for holding said cover against the wall.

* * * * *

UNITED STATES PATENT AND TRADEMARK OFFICE
CERTIFICATE OF CORRECTION

PATENT NO. : 3,940,178
DATED : February 24, 1976
INVENTOR(S) : Edward L. LeVeque It is certified that error appears in the above-identified patent and that said Letters Patent are hereby corrected as shown below:

On the cover page of the patent;

"Edward L. Leveque" should be --Edward L. LeVeque--;

Column 3, line 39;

"land" should be --and--;

Column 4, line 57;

"well" should be --wall--;

Column 4, line 59;

"wheel" (second occurrence) should be --wall--.

Signed and Sealed this twenty-second Day of June 1976

[SEAL]

Attest:

RUTH C. MASON
*Attesting Officer*

C. MARSHALL DANN
*Commissioner of Patents and Trademarks*